United States Patent
Ukai et al.

(10) Patent No.: US 10,430,475 B2
(45) Date of Patent: Oct. 1, 2019

(54) INFORMATION PROCESSING DEVICE, INFORMATION PROCESSING METHOD, PROGRAM AND STORAGE MEDIUM

(71) Applicant: Rakuten, Inc., Tokyo (JP)

(72) Inventors: Hiroshi Ukai, Tokyo (JP); Kazuaki Hiraga, Tokyo (JP); Kotaro Ogino, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 700 days.

(21) Appl. No.: 15/022,040

(22) PCT Filed: Apr. 7, 2014

(86) PCT No.: PCT/JP2014/060092
§ 371 (c)(1),
(2) Date: Mar. 15, 2016

(87) PCT Pub. No.: WO2015/155820
PCT Pub. Date: Oct. 15, 2015

(65) Prior Publication Data
US 2016/0232249 A1    Aug. 11, 2016

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC ........... G06F 16/24578; G06F 16/9535; G06F 16/248
See application file for complete search history.

(56) References Cited

U.S. PATENT DOCUMENTS

| | | | | |
|---|---|---|---|---|
| 7,599,917 | B2* | 10/2009 | Meyerzon | G06F 17/30864 |
| 8,082,246 | B2* | 12/2011 | Meyerzon | G06F 17/30864 |
| | | | | 707/722 |
| 2004/0059628 | A1* | 3/2004 | Parker | G06Q 30/02 |
| | | | | 705/12 |

(Continued)

FOREIGN PATENT DOCUMENTS

| | | |
|---|---|---|
| JP | 2012-128802 A | 7/2012 |
| JP | 5639319 B1 | 12/2014 |
| WO | 2008/014262 A1 | 1/2008 |

OTHER PUBLICATIONS

Hawking et al.; "Measuring Search Engine Quality," 2001—Kluwer Academic Publishers. Manufactured in The Netherlands; Information Retrieval, 4, 33-59, 2001.*

(Continued)

*Primary Examiner* — Ashish Thomas
*Assistant Examiner* — Mellissa M. Ohba
(74) *Attorney, Agent, or Firm* — Sughrue Mion, PLLC

(57) ABSTRACT

Under a preliminary environment, test searches with a current algorithm and a new algorithm are performed. Based on evaluation values related to rankings of the searches calculated based on these results, a first evaluation value for the current algorithm and a second evaluation value for the new algorithm are acquired. A control is performed to present relative evaluation information of the new algorithm with respect to the current algorithm based on these first evaluation value and second evaluation value. The evaluation values related to the rankings are calculated based on relevance corresponding information. In the relevance corresponding information, a relevance score is made to correspond to a test query of a test content data item for each set of the test query and the test content data item related to this test query.

20 Claims, 12 Drawing Sheets

(56) References Cited

U.S. PATENT DOCUMENTS

| | | | | |
|---|---|---|---|---|
| 2004/0205051 | A1* | 10/2004 | Kim | G06F 17/3069 |
| 2005/0154716 | A1* | 7/2005 | Watson | G06F 16/835 |
| 2006/0212265 | A1* | 9/2006 | Amitay | G06F 17/30864 |
| | | | | 702/182 |
| 2007/0094250 | A1* | 4/2007 | Kapur | G06F 17/30675 |
| 2007/0260601 | A1* | 11/2007 | Thompson | G06F 17/30867 |
| 2008/0027913 | A1* | 1/2008 | Chang | G06F 17/30 |
| 2009/0037402 | A1* | 2/2009 | Jones | G06F 16/951 |
| 2009/0037410 | A1* | 2/2009 | Jones | G06F 16/951 |
| 2011/0004588 | A1* | 1/2011 | Leitersdorf | G06F 16/951 |
| | | | | 707/711 |

OTHER PUBLICATIONS

Chapelle et al.l; "Large Scale Validation and Analysis of Interleaved Search Evaluation," Publication date: Feb. 2012—ACM Transactions on Information Systems, vol. 30, No. 1, Article 6.*

Turtle et al.; "Query Evaluation: Strategies and Optimizations ," 1995—Information Processing & Management, vol. 31, No. 6, pp. 831-850, Elsevier Science Ltd. Printed in Great Britain.*

Yuwono et al.; "Search and Ranking Algorithms for Locating Resources on the World Wide Web," 1996—Data Engineering, 1996. Proceedings of the Twelfth International Conference on.*

Hawking et al., "Measuring Search Engine Quality," 2001, Kluwer Academic Publishers; Information Retrieval, 4, 33-59, 2001 (Year: 2001).*

Sanderson, "Test Collection Based Evaluation of Information Retrieval Systems," 2010, Foundations and Trends in Information Retrieval vol. 4, No. 4 (2010) 247-375 (Year: 2010).*

International Search Report for PCT/JP2014/060092 dated May 27, 2014.

Communication dated Dec. 28, 2016 from the European Patent Office in counterpart European Application No. 14888998.3.

* cited by examiner

FIG. 4

|     | Q1 | Q2 | Q3 | ... | Qn |
|-----|----|----|----|-----|----|
| D1  | 3  |    | 5  | ... |    |
| D2  |    | 2  |    | ... | 8  |
| D3  |    |    | 1  | ... |    |
| ⋮   | ⋮  | ⋮  | ⋮  | ⋮   | ⋮  |
| Dm  | 7  |    |    |     | 2  |

FIG. 10

|  | X | | |
| --- | --- | --- | --- |
| QUERY | GENERAL PRODUCT | BOOK | TRAVEL SERVICE |
| Q1 | 0.2 | 0.2 | 0.2 |
| Q2 | 0.5 | 0.2 | 0.5 |
| Q3 | 0.8 | 0.1 | 1.0 |
| ⋮ | ⋮ | ⋮ | ⋮ |
| Qn | 1.0 | 0.4 | 0.8 |

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2014/060092 filed Apr. 7, 2014, the contents of all of which is incorporated herein by reference in its entirety.

TECHNICAL FIELD

The present invention relates to an information processing device that searches a content data item related to an input query among a plurality of content data items including character information and is used for a comparison test between a first search algorithm and a second search algorithm on a search algorithm scoring and ranking the content data items hit by the search. The present invention also relates to an information processing method for the information processing device, a program that achieves the information processing device, and a storage medium that stores the program.

CITATION LIST

Patent Literature

Patent Literature 1: Japanese Unexamined Patent Application Publication No. 2012-128802

BACKGROUND ART

The following technique has been widely known. The technique, for example, searches a web page related to a keyword (a query) input by a user among web pages present on the Internet. Thus, the technique searches a content data item related to the query targeting a plurality of content data items including character information.

There is provided a search technique like this that scores and ranks content data items hit by search in accordance with a predetermined algorithm. In this case, a search result screen displays the content data items hit by the search in a display order in accordance with this ranking.

Here, a version upgrade to a new version is possibly performed on a search engine.

To upgrade the version of a search engine, instead of immediately replacing a search algorithm of a current version (hereinafter designated as a "current algorithm") by a search algorithm of the new version (hereinafter designated as a "new algorithm"), it is preferable to replace the current algorithm with a new algorithm that has passed a preliminary test.

To make such preliminary test on the new algorithm a more practical test, the test can be conducted under an actual environment actually used by a general user. The test under the actual environment is, for example, conducted considering a use ratio of the new algorithm being substantially reduced, for example, the use ratio of the current algorithm to the new algorithm: 9:1. To facilitate confirmation of degree of improvement from the current algorithm, the test is conducted as a comparison test with the current algorithm.

The test under the actual environment uses an evaluation index related to a contribution to sales, for example, Click Through Rate (CTR) and ConVersion Rate (CVR), as a performance evaluation index for the search algorithm.

SUMMARY OF INVENTION

Technical Problem

The above-described comparison test under the actual environment is practical and therefore is preferable. However, considering the use of a general user, the count of executions of the test should be reduced to a minimum.

However, assume a case where an algorithm defective in terms of basic performance, such as the above-described ranking performance, is used as the new algorithm. This requires a modification of the algorithm and re-execution of the test regarding the performance different from the performance in the aspect of contribution to the sales, which is originally desired to be confirmed by the test under the actual environment. Therefore, this situation is not preferable.

Therefore, under the above-described circumstances, the object of the present invention is to appropriately and simply conduct an acceptance-or-rejection judgment whether the new algorithm is capable of minimum search performance that can be used in the comparison test under the actual environment or not, regarding the version upgrade of the search engine.

Solution To Problem

First, an information processing device according to the present invention is for searching a content data item related to an input query among a plurality of content data items including character information. Assuming that a search algorithm for scoring and ranking the content data items hit by the search includes a first search algorithm and a second search algorithm, and the first search algorithm is defined by the search algorithm in use under an actual environment and the second search algorithm is defined by the search algorithm used for a comparison test with the first search algorithm under the actual environment, the information processing device is used for the comparison test between the first search algorithm and the second search algorithm. The comparison test is conducted based on an evaluation index different from the actual environment under a preliminary environment different from the actual environment. The information processing device includes a search-execution control unit, an evaluation value acquiring unit, and a presentation control unit. The search-execution control unit is configured to perform respective searches with an identical selection test query as a first test search and a second test search. The identical selection test query is selected among a plurality of preliminary selected test queries. The first test search sets a plurality of test content data items including character information as a search target. The first test search is performed using the first search algorithm. The second test search sets the plurality of test content data items as a search target. The second test search is performed using the second search algorithm. The evaluation value acquiring unit is configured to acquire a first evaluation value for the first search algorithm and a second evaluation value for the second search algorithm based on evaluation values related to the rankings of the first test search and the second test search. The evaluation values are calculated based on ranking information of the test content data items hit by a search and relevance corresponding information acquired by the respective first test search and second test search. In the relevance corresponding information, a relevance score is made to correspond to a test query of a test content data item for each set of the test query and the test content data item related to this test query. The presentation control unit is configured to perform a control to present relative evaluation information of the second search algorithm with respect to the first search algorithm based on the first evaluation value and the second evaluation value.

Accordingly, the second search algorithm as the new algorithm is evaluated by a relative evaluation using the evaluation value of the first search algorithm as the current algorithm as a reference. This evaluation is performed based on an evaluation value related to a ranking different from the actual environment under a preliminary environment different from the actual environment.

The evaluation value related to the ranking is calculated using the relevance corresponding information where the test query is preliminary made to correspond to the relevance score for each set of the test query and the test content data item related to this test query. This simplifies the processing compared with the case where, for example, the relevance score is calculated each time.

Secondly, with the above-described information processing device according to the present invention, the following is preferable. The search-execution control unit is configured to perform a control to perform the first test search and the second test search with each of a plurality of the selection test queries. The evaluation value acquiring unit is configured to acquire the first evaluation value and the second evaluation value based on the evaluation values related to the rankings of the first test search and the second test search. The evaluation values are calculated for each of the selection test queries in association with the control by the search-execution control unit.

Thus, the first test search and the second test search with the plurality of individual selection test queries are conducted. In response to the searches, the first evaluation value and the second evaluation value calculated for each of the selection test queries are acquired. Thus, the multiphasic evaluation using the various test queries is possible.

Thirdly, with the above-described information processing device according to the present invention, the following is preferable. The evaluation value acquiring unit is configured to acquire a value found by integrating the evaluation values related to the ranking of the first test search calculated for each of the selection test queries into one as the first evaluation value. The evaluation value acquiring unit is configured to acquire a value found by integrating the evaluation values related to the ranking of the second test search calculated for each of the selection test queries into one as the second evaluation value.

This presents the relative evaluation information on the integrated one evaluation value, not the relative evaluation information of the plurality of evaluation values acquired for each selection test query.

Fourth, with the above-described information processing device according to the present invention, the following is preferable. The evaluation value acquiring unit is configured to acquire query importance corresponding to the selection test queries based on importance corresponding information. In the importance corresponding information, the query importance is made to correspond to each of the test queries. The query importance represents a degree of importance of the individual test queries. The evaluation value acquiring unit is configured to adjust the respective evaluation values related to the rankings calculated on the first test search and the second test search based on the acquired query importance. The evaluation value acquiring unit is configured to acquire the first evaluation value and the second evaluation value based on the adjusted respective evaluation values.

Even if an evaluation value of a search result using a less important query is high, it cannot be said that the search performance of the search algorithm is high. In view of this, according to the degree of importance of the query used for the test search, the first evaluation value and the second evaluation value are adjusted.

Fifth, with the above-described information processing device according to the present invention, the following is preferable. The importance corresponding information includes a plural instances of the query importance depending on different application destination environments for the second search algorithm. The plural instances of query importance are made to correspond to the individual test queries. The evaluation value acquiring unit is configured to acquire the one query importance based on instructed application destination identification information among a plural instances of the query importance. The plural instances of query importance are made to correspond to test queries identical to the selection test queries in the importance corresponding information. The evaluation value acquiring unit is configured to adjust the respective evaluation values related to the rankings calculated on the first test search and the second test search based on the acquired query importance. The evaluation value acquiring unit is configured to acquire the first evaluation value and the second evaluation value based on the adjusted respective evaluation values.

If the application destination environments for the search algorithms differ, it is assumed that the degree of importance to the environments differs even if an identical query is used. To handle such situation, an evaluation on the new algorithm using different query importance depending on the difference in the application destination environment is possible.

An information processing method according to the present invention searches a content data item related to an input query among a plurality of content data items including character information. Assuming that a search algorithm for scoring and ranking the content data items hit by the search includes a first search algorithm and a second search algorithm, and the first search algorithm is defined by the search algorithm in use under an actual environment and the second search algorithm is defined by the search algorithm used for a comparison test with the first search algorithm under the actual environment, the information processing method is used for the comparison test between the first search algorithm and the second search algorithm. The comparison test is conducted based on an evaluation index different from the actual environment under a preliminary environment different from the actual environment. The information processing method includes: a search-execution control procedure configured to perform respective searches with an identical selection test query as a first test search and a second test search, the identical selection test query being selected among a plurality of preliminary selected test queries, the first test search setting a plurality of test content data items including character information as a search target, the first test search being performed using the first search algorithm, the second test search setting the plurality of test content data items as a search target, the second test search being performed using the second search algorithm; an evaluation value acquiring procedure configured to acquire a first evaluation value for the first search algorithm and a second evaluation value for the second search algorithm based on evaluation values related to the rankings of the first test search and the second test search, the evaluation values being calculated based on ranking information of the test content data items hit by a search and relevance corresponding information acquired by the respective first test search and second test search, in the relevance corresponding information, a relevance score being made to correspond to a test query of a test content data item for each set of the test query and the test content data item related to the test query; and a presentation control procedure configured to perform a control to present relative evaluation information of the second search algorithm with respect to the first search algorithm based on the first evaluation value and the second evaluation value.

Furthermore, a program according to the present invention is a program that causes an information processing device to execute the processing executed as the information processing method.

Furthermore, a storage medium according to the present invention is a storage medium storing the program. These program and storage medium achieve the above-described information processing device.

Advantageous Effects of Invention

The present invention can appropriately and simply conduct an acceptance-or-rejection judgment whether the new algorithm is capable of minimum search performance that can be used in the comparison test under the actual environment or not regarding the version upgrade of the search engine.

BRIEF DESCRIPTION OF THE DRAWINGS

FIG. 4 is an explanatory view of relevance corresponding information;

FIG. 10 is an explanatory view of importance corresponding information;

DESCRIPTION OF THE EMBODIMENTS

Figure 1:
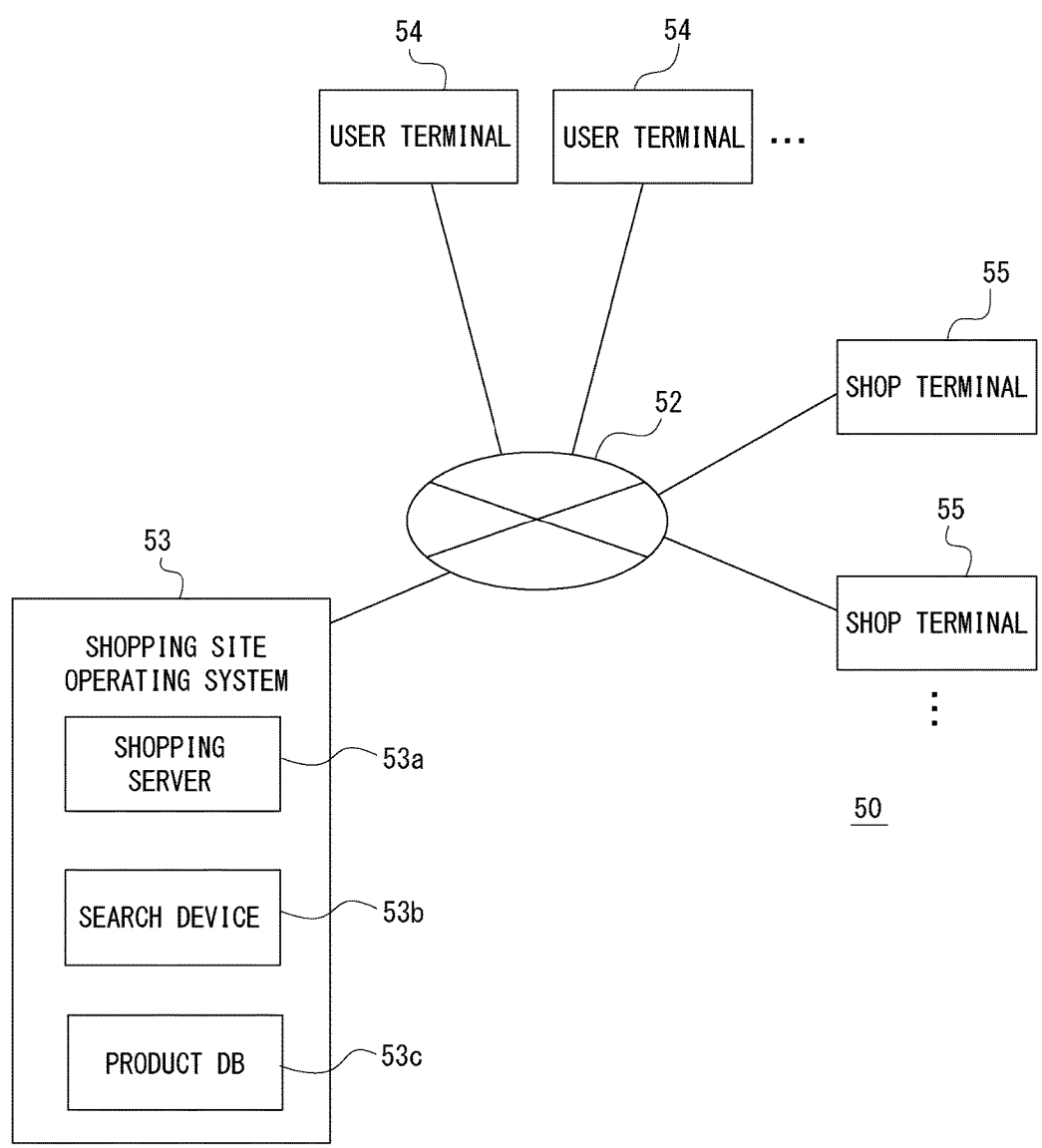
FIG. 1 is a drawing illustrating an exemplary network system configured under an actual environment.

The following describes embodiments in the order listed below.
1. First Embodiment
1-1. Actual Environment
1-2. Comparison Test under Actual Environment
1-3. Evaluation System under Preliminary Environment
1-4. Hardware Configuration
1-5. Processing Procedure
1-6. Summary of First Embodiment
2. Second Embodiment
2-1. Evaluation System and Functions of Controller
2-2. Processing Procedure
2-3. Summary of Second Embodiment
3. Program and Storage Medium
4. Modifications
1. First Embodiment
1-1. Actual Environment FIG. 1 illustrates an exemplary network system 50 formed under the actual environment. This network system 50 functions as an electronic commerce (EC) system. The actual environment means an environment under which a general user uses the network system 50 via a user terminal 54, which will be described later.

In the network system 50, a shopping site operating system 53, a plurality of user terminals 54, 54 . . . , and a plurality of shop terminals 55, 55 . . . are configured so as to be communicable with one another over a network 52, for example, as the Internet.

The user terminal 54 is a computer device including a web browser. As the user terminal 54, for example, a high-function mobile phone (a smart phone), a mobile phone, a portable information terminal (PDA), and a mobile or a desktop personal computer (PC) are listed. Note that the type of the user terminal 54 is not limited to these.

The user terminal 54 transmits a Hypertext Transfer Protocol (HTTP) request to the shopping site operating system 53 to request a web page and predetermined processing. Additionally, the user terminal 54 receives a web page transmitted in response to the HTTP request and displays the web page on the web browser. This allows a user to browse and operate desired web pages.

The shopping site operating system 53 each includes a shopping server 53a, a search device 53b, and a product DB (database) 53c, which are configured by the computer device. These respective devices are communicable with one another via a network, for example, as a Local Area Network (LAN).

The shopping server 53a performs various processing based on the HTTP request, which is transmitted from the user terminal 54. The shopping server 53a, for example, creates and transmits various web pages (for example, a product web page, a shopping cart web page, and an order web page) and performs purchase processing or similar processing in response to an order placement operation by the user.

The network system 50 provides a web site for a virtual mall (an EC site) to a user (a user of the user terminal 54) by the shopping server 53a. In the EC site, a plurality of shops (member stores of the virtual mall) are present. Staff members at the shops each register products of their own shops via the computer device as the shop terminal 55. Thus, various products are uploaded from the various shops on the EC site. A user can access the EC site from the user terminal 54 and purchase a desired product.

On the web page provided by the shopping server 53a, a search bar for product search is disposed. The user can input a keyword for the search to this search bar. A search button is arranged near the search bar. When the user operates this search button, the user can instruct execution of a search based on keyword input to the search bar.

In response to this execution instruction, the user terminal 54 transmits the input keyword as a query for the search to the shopping server 53a.

The query received by the shopping server 53a from the user terminal 54 is forwarded to the search device 53b. The search device 53b functions as a so-called a search engine. Based on the query received from the shopping server 53a, the search device 53b searches a product web page related to the query among product web pages stored in the product DB 53c. Then, the search device 53b transmits the search result to the shopping server 53a.

The product DB 53c stores product information such as a product name, a type, an image of the product, specifications, and a summary for introducing the product; advertising information; or similar information, which are made to correspond to a product ID. The product ID is an identifier to identify the product. The product DB 53c also stores, for example, files of the product web pages described in a markup language, such as a HyperText Markup Language (HTML) and an Extensible Markup Language (XML), or a similar language.

The search device 53b searches the product web pages related to the received query, for example, the product web page including the character information matching the query, based on the above-described product information and the character information (text information) included in the files of the product web pages, which are stored in the product DB 53c, or similar information. The search device 53b also scores and ranks the product web pages hit by the search in accordance with a predetermined algorithm. The search results by the search device 53b include respective ranking information of the product web pages hit by the search.

The search result screen is presented to the user based on the search results by the search device 53b. The search result screen displays the product web pages hit by the search in a display order in accordance with the above-described ranking information.

1-2. Comparison Test under Actual Environment

Here, under the above-described actual environment, when upgrading a version of a search algorithm in the search device 53b, a comparison test is conducted. The comparison test compares a search algorithm of a current version (hereinafter designated as a "current algorithm") with a search algorithm of a new version (hereinafter designated as a "new algorithm").

Figure 2:
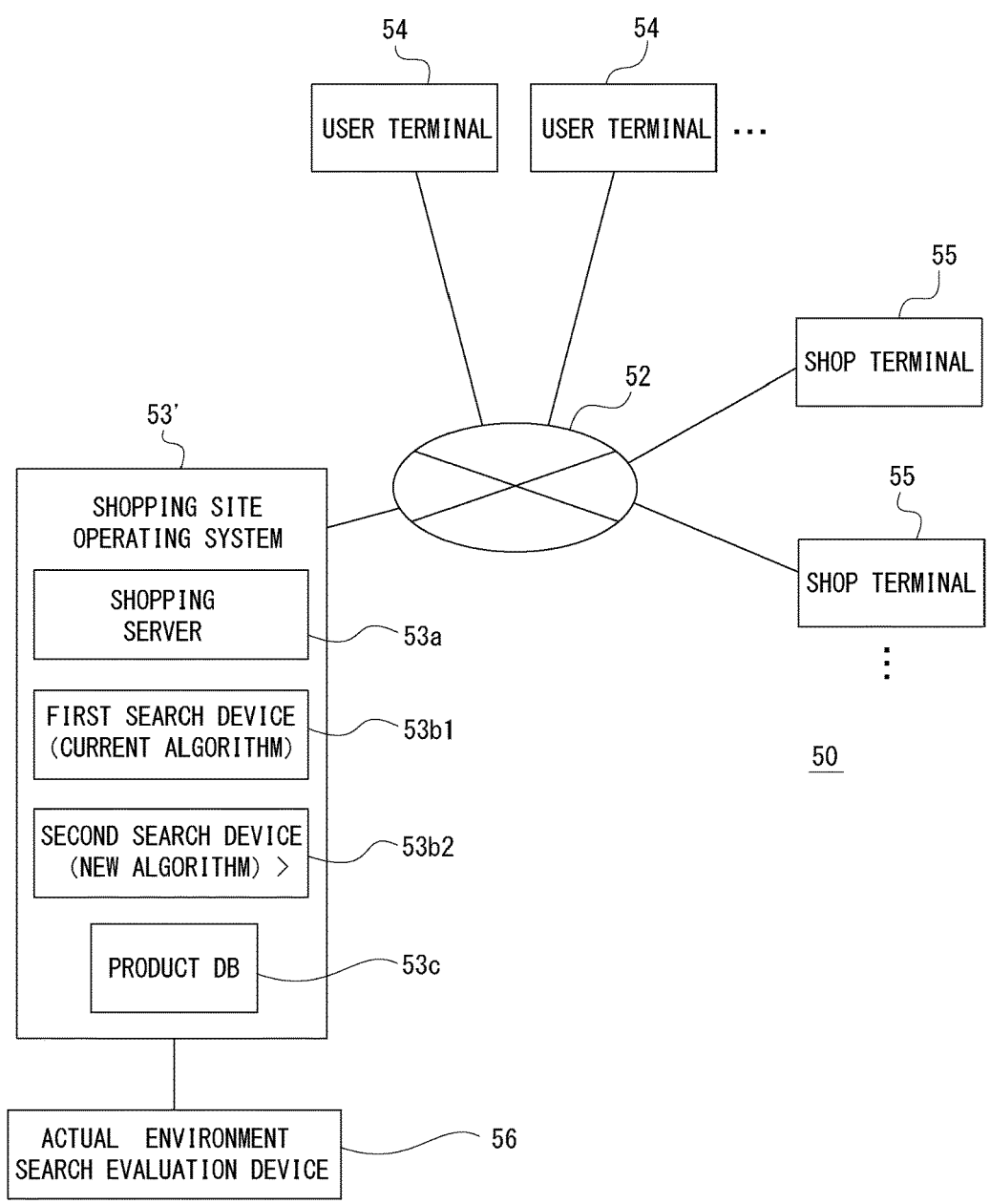
FIG. 2 is a drawing for describing a comparison test between a current algorithm and a new algorithm under the actual environment.

The following describes the comparison test between the current algorithm and the new algorithm under the actual environment with reference to FIG. 2.

In FIG. 2, like reference numerals designate parts similar to the parts already described in FIG. 1, and therefore such elements will not be further elaborated here.

For the comparison test under the actual environment, the network system 50 includes a shopping site operating system 53' and an actual environment search evaluation device 56. The shopping site operating system 53' includes the shopping server 53a, a first search device 53b1, a second search device 53b2, and the product DB 53c.

In the shopping site operating system 53', the first search device 53b1 is the search device 53b that performs a search with the current algorithm while the second search device 53b2 is the search device 53b that performs a search with the new algorithm.

The shopping server 53a in this case transmits a part of queries among the plurality of queries received from the user terminals 54, 54 . . . to the first search device 53b1 and transmits the remaining queries to the second search device 53b2 to cause the respective first search device 53b1 and second search device 53b2 to perform the respective searches.

Thus, during the execution of comparison test, the first search device 53b1 performs a part of searches among the searches whose executions are instructed from the user terminals 54, 54 . . . while the second search device 53b2 performs the remaining searches. In this case, the use ratio of the current algorithm to the new algorithm is adjusted such that the use ratio of the new algorithm is substantially reduced, for example, 9:1. That is, to achieve such use ratio, the shopping server 53a adjusts a ratio of assigning the queries for the first search device 53b1 and the second search device 53b2.

The actual environment search evaluation device 56 is configured as the computer device. The actual environment search evaluation device 56 is mutually communicable with the shopping server 53a of the shopping site operating system 53'.

The actual environment search evaluation device 56 calculates predetermined evaluation values of the respective current algorithm and new algorithm, which are used by the first search device 53b1 and the second search device 53b2, respectively. Specifically, the actual environment search evaluation device 56 calculates the evaluation values related to the contribution to the sales of sales products on the EC site, such as a Click Through Rate (CTR), a ConVersion Rate (CVR), and a gross sales.

Here, the CTR means a CTR regarding clicks executed on the product web pages (Uniform Resource Locator (URL) links) presented as the search results by the first search device 53b1 and the second search device 53b2. Here, the CVR means a proportion that the product web pages presented as the search results by the first search device 53b1 and the second search device 53b2 are clicked and products posted on these product web pages are purchased, using a count of unit searches by the first search device 53b1 and the second search device 53b2 as a reference.

Furthermore, the above-described gross sales is found by calculating the gross sales of products purchased via the product web pages presented as the search results by the first search device 53b1 and the second search device 53b2.

Based on the evaluation values for the respective first search device 53b1 and second search device 53b2 calculated by the actual environment search evaluation device 56, the comparison test under the actual environment determines whether to accept or reject the new algorithm. For example, the acceptance-or-rejection judgment is conducted by whether the new algorithm has a better evaluation value than the current algorithm or not.

1-3. Evaluation System Under Preliminary Environment

The above-described comparison test under the actual environment is practical and therefore is preferable. However, considering the use of a general user, the count of executions of the test should be reduced to a minimum.

However, assume a case where an algorithm defective in terms of basic performance, such as the above-described ranking performance, is used as the new algorithm. This requires a modification of the algorithm and re-execution of the test regarding the performance different from the performance in the aspect of contribution to the sales, which is originally desired to be confirmed by the test under the actual environment. Therefore, this situation is not preferable.

Therefore, this embodiment uses the following method. Under a preliminary environment different from the actual environment, whether the new algorithm is capable of the minimum search performance that can be used in the comparison test under the actual environment or not is preliminarily tested. The new algorithm determined as passed by this test under the actual environment is used for the comparison test under the actual environment.

Figure 3:
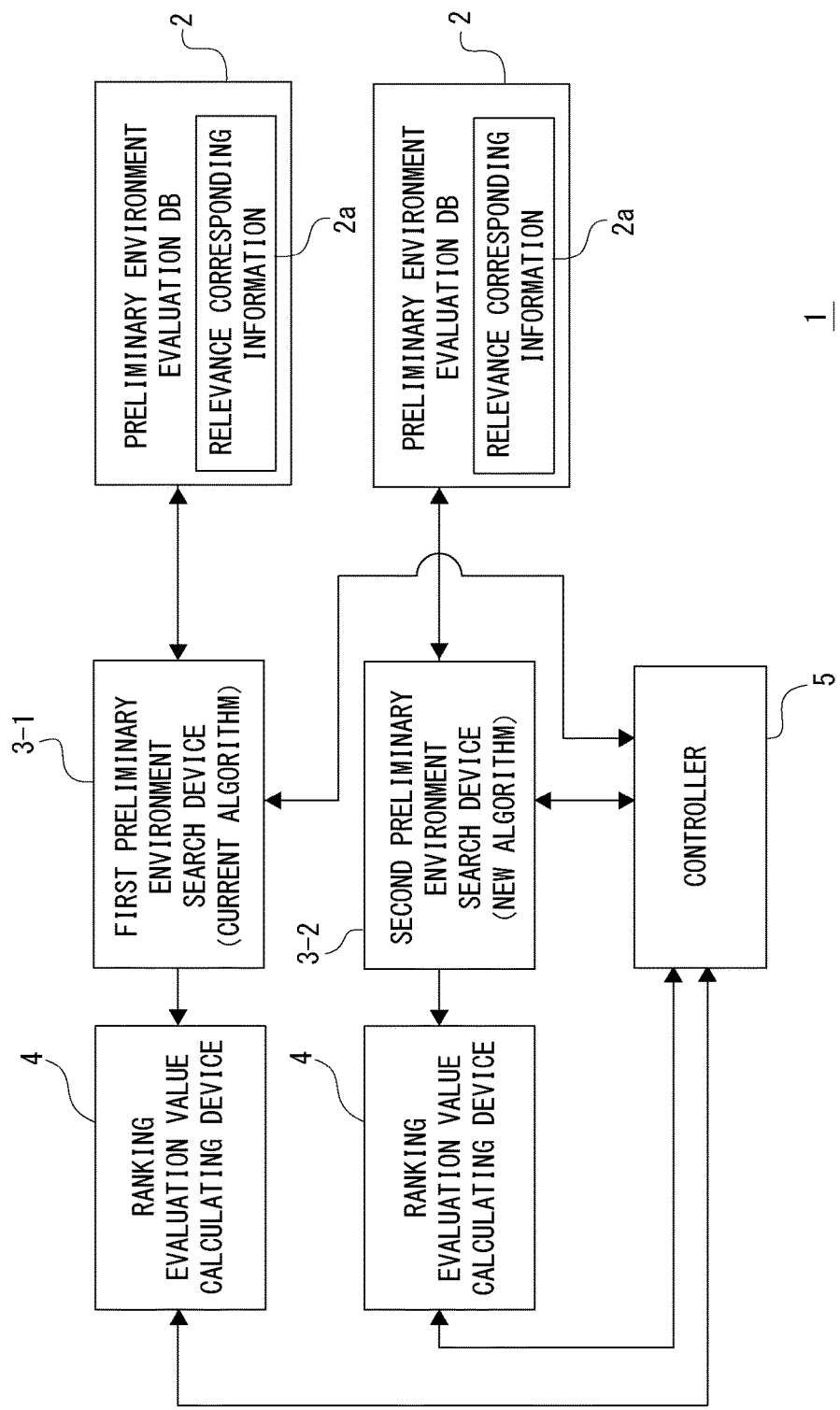
FIG. 3 is a block diagram illustrating a schematic configuration of a preliminary environment evaluation system that includes an information processing device of a first embodiment.

FIG. 3 is a block diagram illustrating a schematic configuration of a preliminary environment evaluation system 1 to test the new algorithm under the preliminary environment.

The preliminary environment evaluation system 1 includes a preliminary environment evaluation DB 2, the preliminary environment evaluation DB 2, a first preliminary environment search device 3-1, a second preliminary environment search device 3-2, a ranking evaluation value calculating device 4, the ranking evaluation value calculating device 4, and a controller 5.

These devices are each configured by a computer device. The devices are communicable with one another by the network such as a LAN or a predetermined wireless or wired communications system.

The preliminary environment evaluation DBs 2 each stores relevance corresponding information 2a. The relevance corresponding information 2a is used for calculating a ranking evaluation value Vr, which will be described later. The preliminary environment evaluation DBs 2 also each stores a plurality of test content data items searched by the first preliminary environment search device 3-1 and the second preliminary environment search device 3-2. The count of these content data items and the individual contents of the test content data items are identical between the respective preliminary environment evaluation DBs 2. As the test content data items, since the search target under the actual environment is web page data items including the character information, the content data items including the character information are used. In this example, from an aspect of reduction in data capacity or a similar reduction, the web page data is not used as it is, but document data in text is used.

The count of test content data items stored in the preliminary environment evaluation DB 2 is, for example, around million.

Figure 4:
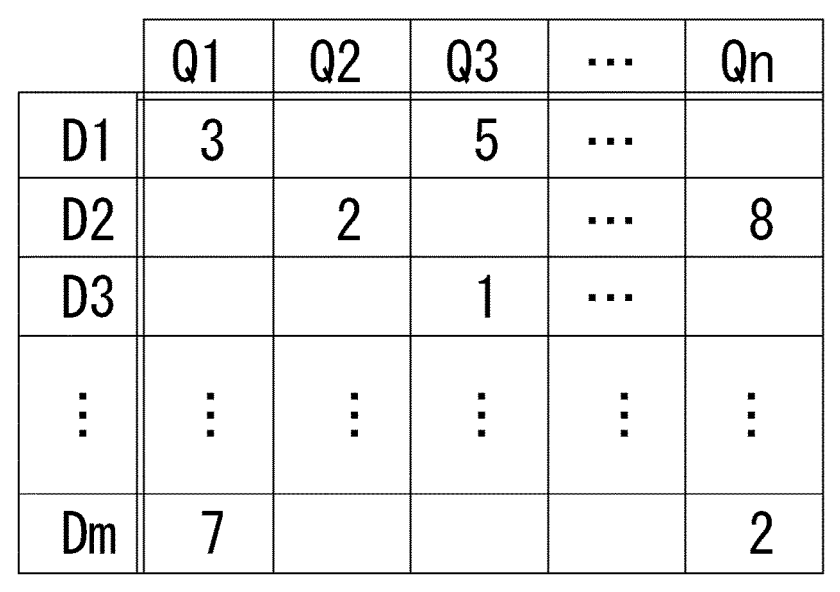

FIG. 4 is an explanatory view of the relevance corresponding information 2a.

The relevance corresponding information 2a is information listing a plurality of test queries (Q1 to Qn in the drawing) preliminary selected for the test and the plurality of test content data items (D1 to Dm in the drawing) stored in the preliminary environment evaluation DB 2. A relevance score R is made to correspond to each set of the test query and the test content data item related to this test query.

In the example in FIG. 4, the test content data items related to the test query of "Q1" are "D1" and "Dm" among the plurality of test content data items D1 to Dm. That is, when performing a search using "Q1" as the query, the test content data items of "D1" and "Dm" are hit by the search.

In the relevance corresponding information 2a, the relevance score R, that is, a score representing degree of association of the test content data item to the test query, is made to correspond to each set of such test query and the test content data item related to this test query. In the example in FIG. 4, to the set of the test query of "Q1" and the test content data item of "D1", as the relevance score R of "D1" to "Q1", "3" is made to correspond. To the set of the test query of "Q1" and the test content data item of "Dm", as the relevance score R of "Dm" to "Q1", "7" is made to correspond.

The relevance score R is, for example, a value obtained by a person from a content of a document of the test content data item.

Now returning to FIG. 3, the first preliminary environment search device 3-1 is a search device that searches the plurality of test content data items stored in the one preliminary environment evaluation DB 2 with the current algorithm.

The second preliminary environment search device 3-2 is a search device that searches the plurality of test content data items stored in the other preliminary environment evaluation DB 2 with the new algorithm.

These first preliminary environment search device 3-1 and second preliminary environment search device 3-2, as understood from the fact that the devices use the current algorithm and the new algorithm respectively, also rank the content data items hit by the search, as well as the above-described first search device 53b1 and second search device 53b2.

The first preliminary environment search device 3-1 and the second preliminary environment search device 3-2 search based on the test queries input from the controller 5. The first preliminary environment search device 3-1 transmits the information on the search results (including the ranking information of the test content data items hit by the search) to the corresponding one ranking evaluation value calculating device 4 among the ranking evaluation value calculating devices 4 and 4. The second preliminary environment search device 3-2 transmits the information on the search results to the corresponding other ranking evaluation value calculating device 4 among the ranking evaluation value calculating devices 4 and 4. To ensure the calculation of the ranking evaluation values by the ranking evaluation value calculating devices 4 and 4, the first preliminary environment search device 3-1 and the second preliminary environment search device 3-2 acquire the relevant relevance score R from the relevance corresponding information 2a together with the information on the search results. The first preliminary environment search device 3-1 and the second preliminary environment search device 3-2 transmit the relevance score R to the corresponding ranking evaluation value calculating device 4 among the ranking evaluation value calculating devices 4 and 4. That is, among the relevance scores R stored in the relevance corresponding information 2a, the first preliminary environment search device 3-1 and the second preliminary environment search device 3-2 transmit the relevance score R made to correspond to the set of the test content data items hit by this search and the test query used for this search.

The ranking evaluation value calculating devices 4 and 4 each calculates the ranking evaluation values Vr based on the information on the search results and the relevance score R received from the corresponding device among the first preliminary environment search device 3-1 and the second preliminary environment search device 3-2.

The ranking evaluation value Vr is an evaluation value related to the ranking of the test content data items hit by the search. For example, the ranking evaluation value Vr is the evaluation value representing to what extent the ranking is close to an ideal ranking.

In this example, the ranking evaluation value calculating device 4 calculates Normalized Discounted Cumulative Gain (nDCG) as the ranking evaluation value Vr. As well-known, the nDCG is an evaluation index representing to what extent the ranking of the content data items hit by the search performed with a certain query is close to the ideal ranking predetermined on the query. Specifically, the nDCG is found by first discounting the relevance score R of each content data items hit by the search according to the ranking of the content data items. Then, the DCG as a value of adding these values is divided by the ideal DCG to be normalized.

As the ranking evaluation value Vr, the DCG may be calculated. As long as the evaluation index represents to what extent the ranking obtained as the search result is close to the ideal ranking, the evaluation index is not limited to the nDCG.

The controller 5 is one embodiment of the information processing device of the present invention. The controller 5 is a device on which a person who conducts the test performs an operation input when conducting the comparison test under the preliminary environment.

Figure 5:
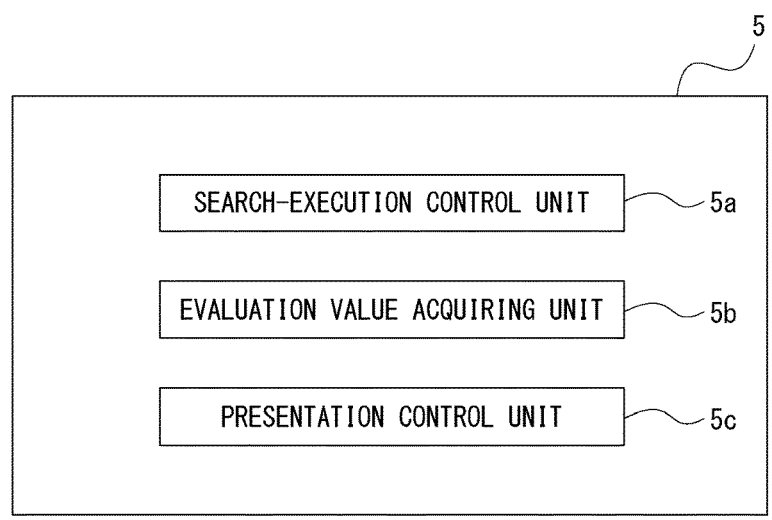
FIG. 5 is a block diagram illustrating functions that the information processing device of the first embodiment has as function blocks.

The controller 5 of the embodiment has a function expressed by the respective function blocks illustrated in FIG. 5.

In FIG. 5, the controller 5 has various functions as a search-execution control unit 5*a*, an evaluation value acquiring unit 5*b*, and a presentation control unit 5*c*.

The search-execution control unit 5*a* performs an execution instruction of search on the first preliminary environment search device 3-1 and the second preliminary environment search device 3-2 based on, for example, the operation input by the person who conducts the test or a similar person. In this embodiment, the comparison test causes the first preliminary environment search device 3-1 and the second preliminary environment search device 3-2 to sequentially search the individual n (n is a natural number of 2 or more) pieces of test queries. In view of this, the search-execution control unit 5*a* sequentially selects one test query among the n pieces of the test queries based on the operation input of instructing a test start by the person who conducts the test or a similar person. The search-execution control unit 5*a* sequentially transmits the selected identical test query to the first preliminary environment search device 3-1 and the second preliminary environment search device 3-2 and causes the respective devices to perform the search.

In this case, whenever the first preliminary environment search device 3-1 and the second preliminary environment search device 3-2 complete the search, the devices sequentially transmit the information on the search results and the information on the relevance scores R to the ranking evaluation value calculating devices 4 and 4. The ranking evaluation value calculating devices 4 and 4 sequentially calculate the ranking evaluation values Vr based on the information on the search results and the information on the relevance scores R, which are thus transmitted at every completion of the search. In view of this, the ranking evaluation values Vr for each test query are obtained for both the current algorithm and the new algorithm.

Based on the ranking evaluation values Vr, which are calculated by the ranking evaluation value calculating devices 4 and 4 as described above, the evaluation value acquiring unit 5*b* acquires a first evaluation value and a second evaluation value. The first evaluation value is an evaluation value regarding the current algorithm. The second evaluation value is an evaluation value regarding the new algorithm.

Responding to that the plurality of respective ranking evaluation values Vr regarding the current algorithm and the new algorithm are obtained, this example converts each of the first evaluation value and the second evaluation value into a value found by integrating the plurality of respective ranking evaluation values Vr into one. Specifically, the evaluation value acquiring unit 5*b* in this example acquires a summed value of the plurality of ranking evaluation values Vr calculated regarding the current algorithm by the one ranking evaluation value calculating device 4 as the first evaluation value. The evaluation value acquiring unit 5*b* acquires a summed value of the plurality of ranking evaluation values Vr calculated regarding the new algorithm by the other ranking evaluation value calculating device 4 as the second evaluation value.

Thus, the acquisition of the value found by each integrating the first evaluation value and the second evaluation value as one value facilitates grasping the evaluation values on the current algorithm and the new algorithm.

Such integrated evaluation value may be, for example, the average value of the plurality of ranking evaluation values Vr. As long as the evaluation value is a value integrated into one value, the evaluation value is not especially limited.

The presentation control unit 5*c* performs a control such that a required presentation device presents relative evaluation information. The relative evaluation information is information of the new algorithm with respect to the current algorithm based on the first evaluation value and the second evaluation value acquired by the evaluation value acquiring unit 5*b*.

Specifically, the presentation control unit 5*c* in this example performs the control such that a display device coupled to the controller 5 or a display provided to the controller 5 comparably displays the first evaluation value and the second evaluation value, which are acquired by the evaluation value acquiring unit 5*b*.

Here, the relative evaluation information is information representing a relative relationship of the first evaluation value to the second evaluation value. Therefore, the relative evaluation information is not limited to the information comparably representing the first evaluation value and the second evaluation value as described above. For example, the relative evaluation information can be another information, such as a value of subtracting the first evaluation value from the second evaluation value.

The presentation of the relative evaluation information is not limited to the visual presentation. The presentation can be performed by another method, such as an aural presentation using a speaker or a similar device.

1-4. Hardware Configuration

Figure 6:
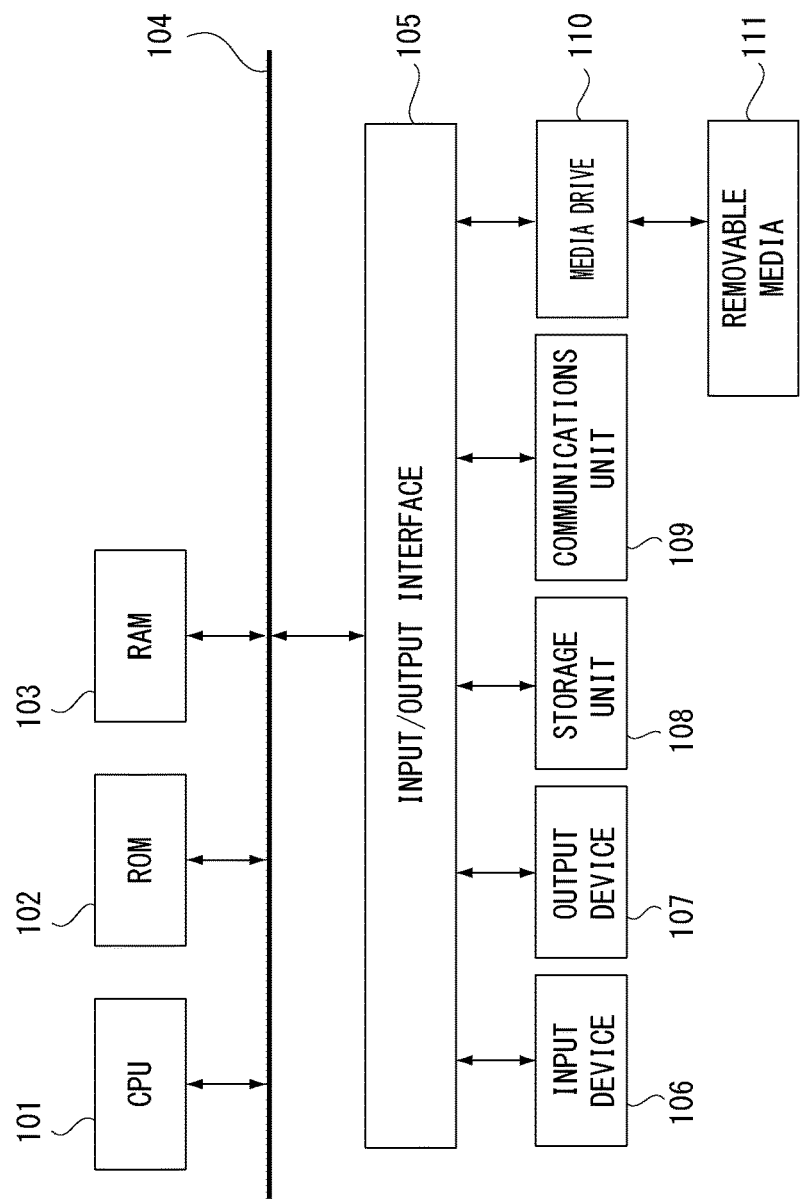
FIG. 6 is a block diagram of a computer device of an embodiment.

FIG. 6 illustrates the hardware configuration of the computer device configuring the respective devices including the controller 5 illustrated in FIG. 3 (the preliminary environment evaluation DB 2, the first preliminary environment search device 3-1, the second preliminary environment search device 3-2, and the ranking evaluation value calculating device 4).

The computer devices configuring the respective devices described in FIG. 1 and FIG. 2 (the user terminal 54, the shop terminal 55, the shopping server 53*a*, the search device 53*b*, the product DB 53*c*, the first search device 53*b*1, the second search device 53*b*2, and the actual environment search evaluation device 56) also have the similar hardware configuration.

In FIG. 6, a Central Processing Unit (CPU) 101 of the computer device performs various processing in association with a program stored in a Read Only Memory (ROM) 102 or a program loaded from a storage unit 108 to a Random Access Memory (RAM) 103. The RAM 103 also appropriately stores data required for the CPU 101 to perform the various processing or similar data.

The CPU 101, the ROM 102, and the RAM 103 are mutually coupled via a bus 104. An input/output interface 105 is also coupled to this bus 104.

To the input/output interface 105, an input device 106, an output device 107, the storage unit 108, and a communications unit 109 are coupled. The input device 106 includes a keyboard, a computer mouse, a touchscreen, or a similar unit. The output device 107 is includes a display (a display device), including a Liquid Crystal Display (LCD), a Cathode Ray Tube (CRT), an organic Electroluminescence (EL) panel, or a similar unit; and a speaker or a similar unit. The storage unit 108 is constituted of a Hard Disk Drive (HDD), a flash memory device, or a similar device. A communications unit 109 performs mutual communications with an external device.

Additionally, a media drive 110 is coupled to the input/output interfaces 105 as necessary. A removable medium 111, such as a magnetic disk, an optical disk, a magneto-optical disk, or a semiconductor memory, is appropriately mounted. Thus, information is written to and read from the removable medium 111.

Such computer device uploads and downloads data and a program through communications with the communications unit 109 and can exchange data and a program via the removable medium 111.

Process operations based on various programs by the CPU 101 perform information processing and communications, which are described later, especially by the computer device as the controller 5.

1-5. Processing Procedure

The following describes a specific processing procedure for implementing the respective functions of the controller 5, which are described above, with reference to the flowcharts in FIG. 7 and FIG. 8.

Figure 7:
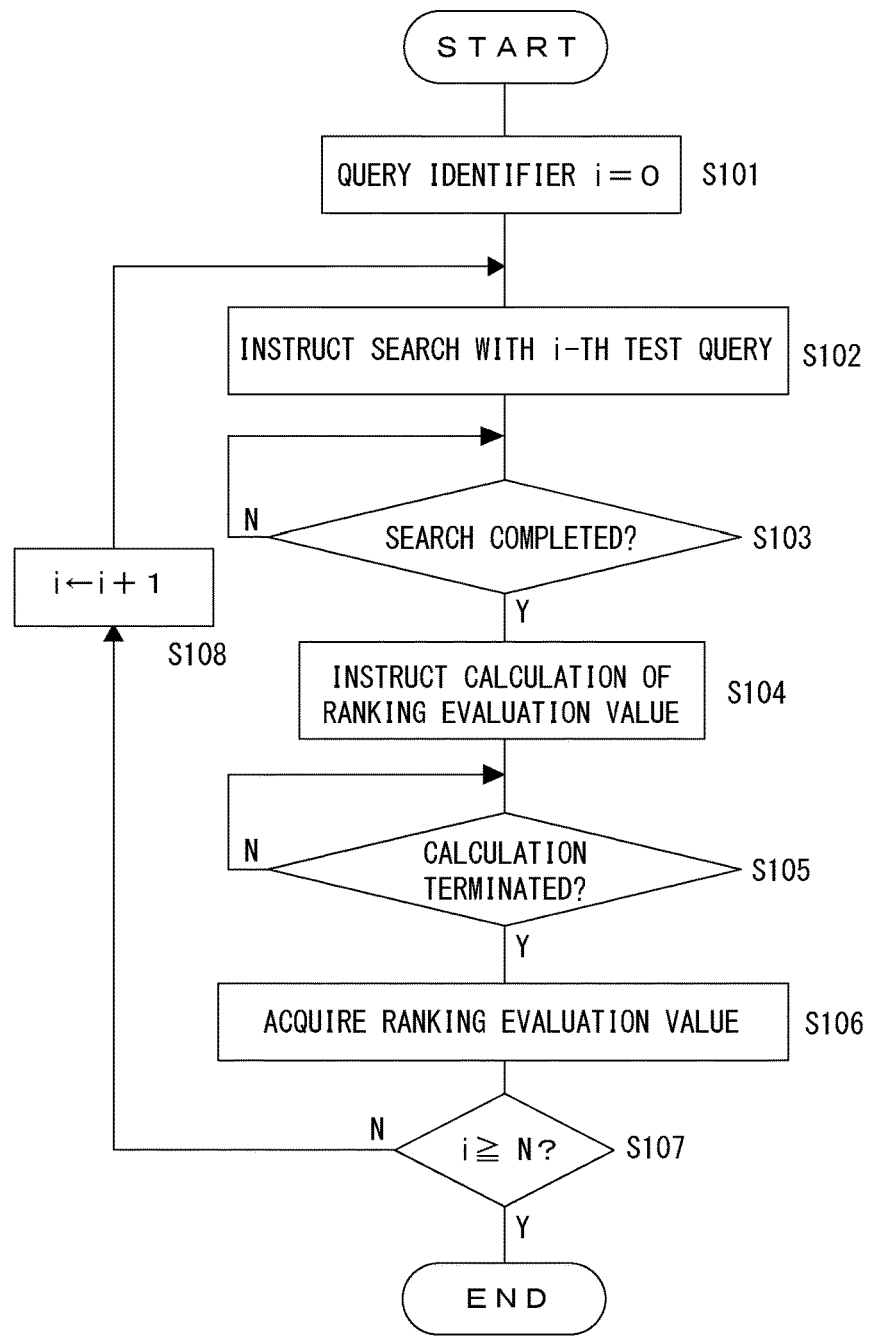
FIG. 7 is a flowchart showing processing corresponding to a search-execution control unit as processing to implement functions of the information processing device of the first embodiment.

FIG. 7 shows processing corresponding to the search-execution control unit 5a.

The processing shown in FIG. 7 starts, for example, in response to the operation input instructing the start of the comparison test by a person who conducts the test or a similar person.

The processing shown in FIG. 7 shows processing executed on one of the current algorithm side (the first preliminary environment search device 3-1 and the one ranking evaluation value calculating device 4) and the new algorithm side (the second preliminary environment search device 3-2 and the other ranking evaluation value calculating device 4). The controller 5, for example, concurrently performs the processing shown in FIG. 7 on both the current algorithm side and the new algorithm side.

In FIG. 7, the controller 5 resets a query identifier i by 0 at Step S101. The query identifier i is a value for identifying the test query used for the search.

Subsequently, at Step S102, the controller 5 performs processing to instruct the search with an i-th test query to any one of the corresponding first preliminary environment search device 3-1 and second preliminary environment search device 3-2. That is, the controller 5 instructs the i-th test query selected among the n pieces of test queries to any one of the corresponding first preliminary environment search device 3-1 and second preliminary environment search device 3-2 to cause the device to perform the search with this test query.

Next, the controller 5 waits until the completion of search at Step S103. In response to the completion of search, the controller 5 instructs the calculation of the ranking evaluation value Vr at Step S104. That is, the controller 5 instructs the calculation of the ranking evaluation value Vr to the ranking evaluation value calculating device 4 at a side that receives search result information on the search performed in response to the instruction at Step S102.

In response to the execution of this calculation instruction, the controller 5 waits until the calculation is terminated at Step S105. In response to the termination of the calculation, the controller 5 acquires the calculated ranking evaluation value Vr at Step S106.

Subsequently, at Step S107, the controller 5 determines whether the query identifier i is equal to or more than an upper limit value n or not. When the controller 5 determines that the query identifier i is not equal to or more than the upper limit value n, the process proceeds to Step S108, the controller 5 increments (i←i +1) the query identifier i, and the process returns to Step S102. Accordingly, the processing at Steps S102 to S107 are repeatedly performed until the search with all the n pieces of test queries and the calculation of the ranking evaluation values Vr are performed.

Meanwhile, when the controller 5 determines that the query identifier i is equal to or more than the upper limit value n at Step S107, the controller 5 terminates the processing shown in this drawing.

Figure 8:
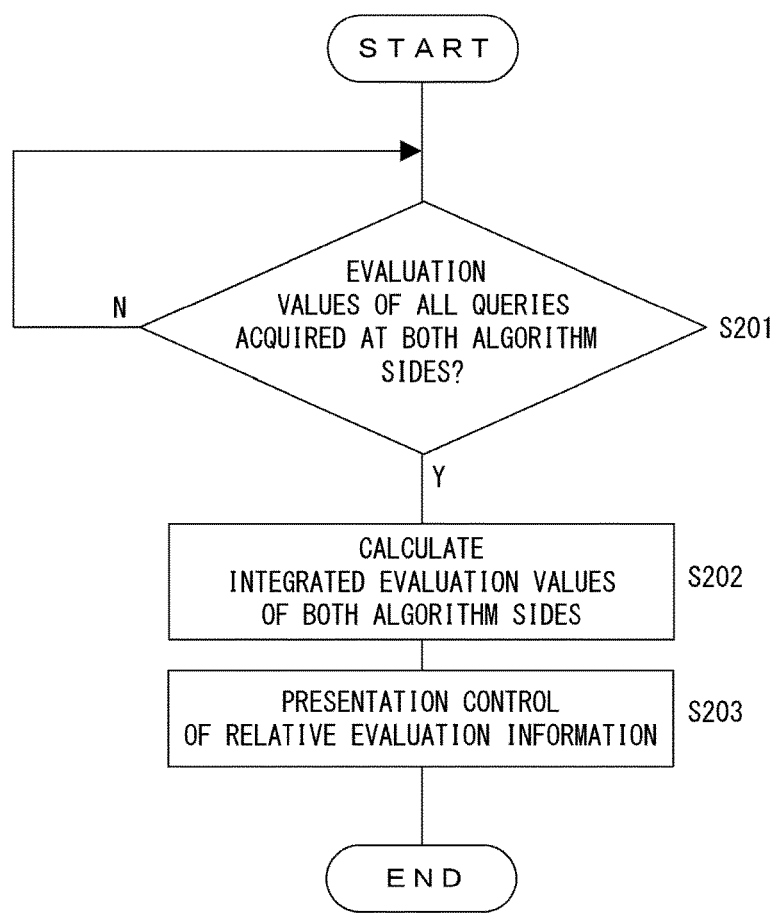
FIG. 8 is a flowchart showing processing corresponding to an evaluation value acquiring unit and a presentation control unit as processing to achieve the functions of the information processing device of the first embodiment.

FIG. 8 shows processing corresponding to the evaluation value acquiring unit 5b and the presentation control unit 5c.

In FIG. 8, the controller 5 waits until the ranking evaluation values Vr of the all queries are acquired on both the current algorithm side and the new algorithm side at Step S201.

That is, in association with the execution of the processing shown in FIG. 7 on both the current algorithm side and the new algorithm side, the controller 5 waits until the controller 5 acquires the n pieces of the ranking evaluation values Vr at the current algorithm side and the n pieces of the ranking evaluation values Vr at the new algorithm side, 2n pieces of the ranking evaluation values Vr in total, from the ranking evaluation value calculating devices 4 and 4.

In the case where the controller 5 can acquire the ranking evaluation values Vr of all the queries on both the current algorithm side and the new algorithm side, the controller 5 calculates integrated evaluation values of both algorithm side at Step S202. That is, in this example, the controller 5 acquires each of the summed value of the n pieces of the ranking evaluation values Vr calculated on the current algorithm side as the first evaluation value and the summed value of the n pieces of the ranking evaluation values Vr calculated on the new algorithm side as the second evaluation value by calculation.

Subsequently, at Step S203, the controller 5 performs the presentation control of the relative evaluation information. That is, in this example, the controller 5 performs the control such that the display, which is described as the output device 107 in FIG. 6, comparably presents the first evaluation value and the second evaluation value acquired by the calculation processing at Step S202.

1-6. Summary of First Embodiment

As described above, the information processing device (the controller 5) of the first embodiment is for searching a content data item related to an input query among a plurality of content data items including character information.

Assuming that a search algorithm for scoring and ranking the content data items hit by the search includes a first search algorithm (a current algorithm) which is defined by the search algorithm in use under an actual environment and a second search algorithm (a new algorithm) which is defined by the search algorithm used for a comparison test with the first search algorithm under the actual environment, the information processing device is used for the comparison test between the first search algorithm and the second search algorithm. The comparison test is conducted based on an evaluation index different from the actual environment under a preliminary environment different from the actual environment.

The information processing device of the first embodiment includes the search-execution control unit $5a$, the evaluation value acquiring unit $5b$, and the presentation control unit $5c$. The search-execution control unit $5a$ is configured to perform respective searches with an identical selection test query as a first test search (a search by the first preliminary environment search device 3-1) and a second test search (a search by the second preliminary environment search device 3-2). The identical selection test query is selected among a plurality of preliminary selected test queries. The first test search sets a plurality of test content data items including character information as a search target. The first test search is performed using the first search algorithm. The second test search sets the plurality of test content data items as a search target. The second test search is performed using the second search algorithm.

The evaluation value acquiring unit $5b$ is configured to acquire a first evaluation value for the first search algorithm and a second evaluation value for the second search algorithm based on evaluation values (ranking evaluation values Vr) related to the rankings of the first test search and the second test search. The evaluation values are calculated based on ranking information of the test content data items hit by a search and relevance corresponding information $2a$ acquired by the respective first test search and second test search. In the relevance corresponding information $2a$, the relevance score R is made to correspond to a test query of a test content data item for each set of the test query and the test content data item related to this test query.

Furthermore, the presentation control unit $5c$ is configured to perform a control to present relative evaluation information of the second search algorithm with respect to the first search algorithm based on the first evaluation value and the second evaluation value.

Accordingly, the second search algorithm as the new algorithm is evaluated by the relative evaluation using the evaluation value of the first search algorithm as the current algorithm as a reference. This evaluation is performed based on the ranking evaluation value Vr different from the actual environment under the preliminary environment different from the actual environment.

This allows appropriately conducting the acceptance-or-rejection judgment whether the new algorithm is capable of minimum search performance that can be used in the comparison test under the actual environment or not.

The ranking evaluation value Vr is calculated using the relevance corresponding information $2a$ where the test query is preliminary made to correspond to the relevance score R for each set of the test query and the test content data items related to this test query. This simplifies the processing compared with the case where, for example, the relevance score R is calculated each time.

As described above, the controller 5 of the embodiment can appropriately and simply conduct the acceptance-or-rejection judgment whether the new algorithm is capable of minimum search performance that can be used in the comparison test under the actual environment or not regarding the version upgrade of the search engine.

The information processing device of the first embodiment is configured as follows. The search-execution control unit $5a$ is configured to perform a control to perform the first test search and the second test search with a plurality of the individual selection test queries. The evaluation value acquiring unit $5b$ is configured to acquire the first evaluation value and the second evaluation value based on the evaluation values related to the rankings of the first test search and the second test search. The evaluation values are calculated for each of the selection test queries in association with the control by the search-execution control unit $5a$.

Thus, the first test search and the second test search with the plurality of individual selection test queries are conducted. According to this, the first evaluation value and the second evaluation value calculated for each of the selection test queries are acquired. Thus, the multiphasic evaluation using various test queries is possible.

This allows further properly conducting the acceptance-or-rejection judgment on the new algorithm.

Furthermore, the information processing device of the first embodiment is configured as follows. The evaluation value acquiring unit $5b$ is configured to acquire a value found by integrating the evaluation values related to the ranking of the first test search calculated for each of the selection test queries into one as the first evaluation value. The evaluation value acquiring unit $5b$ is configured to acquire a value found by integrating the evaluation values related to the ranking of the second test search calculated for each of the selection test queries into one as the second evaluation value.

This presents the relative evaluation information on the integrated one evaluation value, not the relative evaluation information of the plurality of evaluation values acquired for each selection test query.

Accordingly, the relative evaluation information is easily grasped, ensuring facilitating the acceptance-or-rejection judgment on the new algorithm.

2. Second Embodiment 2-1. Evaluation System and Functions of Controller

Subsequently, the following describes the second embodiment.

The second embodiment adjusts the ranking evaluation values Vr based on query importance X represents degree of importance of the individual test queries.

Figure 9:
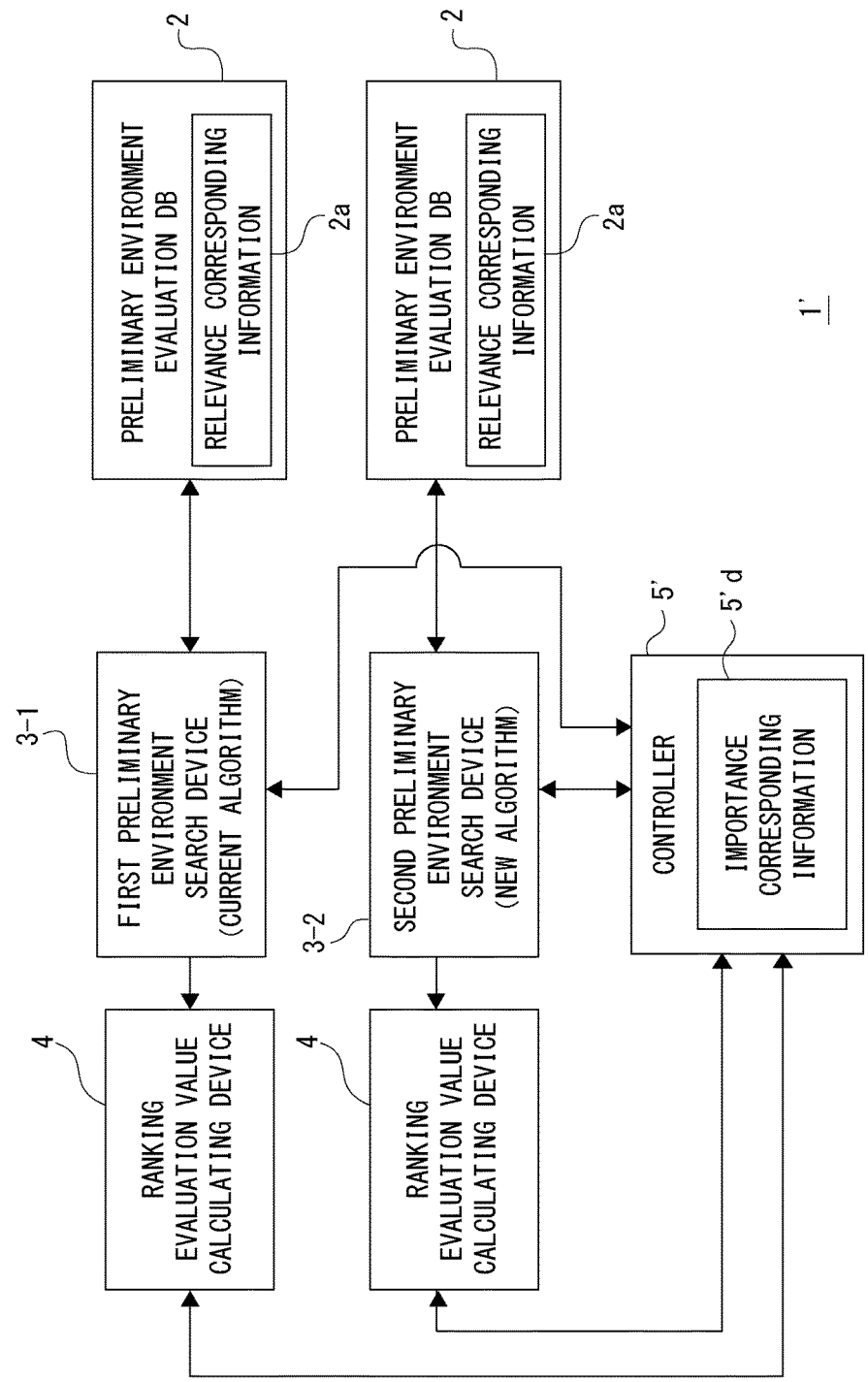
FIG. 9 is a block diagram illustrating a schematic configuration of a preliminary environment evaluation system that includes an information processing device of a second embodiment.

FIG. 9 is a block diagram illustrating a schematic configuration of a preliminary environment evaluation system 1' as the second embodiment.

Like reference numerals designate parts similar to the parts already described in the first embodiment, and therefore such elements will not be further elaborated here.

The preliminary environment evaluation system 1' differs from the preliminary environment evaluation system 1 in that a controller 5' is disposed instead of the controller 5.

The controller 5' stores importance corresponding information $5'd$. The importance corresponding information $5'd$ represents a correspondence relationship between the individual test queries and the query importance X.

FIG. 10 is an explanatory view of the importance corresponding information $5'd$.

Here, the query has the degree of importance.

For example, in the case where the query is a prominent product name, book title, or similar item, it can be said that the degree of importance of the query is high. Query importance X is an index representing the degree of importance that the query itself has. The query importance X, for example, can be obtained by a person for each test query.

The query importance X differs depending on a sort of a product targeted by the search using the query. In other words, the query importance X should be changed depending on what sort of products are sold at the shopping site on which the search using the new algorithm is expected to be performed (that is, to what sort of the shopping site that the search using the new algorithm is expected to be applied).

For example, assume the case of the query being a "one-piece dress," which is relevant to both a title of a prominent book and a name of a kind of clothing, and the degree of importance as the title of the book is high. The query importance X should be changed in the case where the application destination environment of the new algorithm is a shopping site that mainly sells books and in the case where the application destination environment is a shopping site that mainly deals with products other than books. Specifically, in this case, the query importance X in the case where the application destination environment is the shopping site that mainly sells the books should be set higher than the shopping site that mainly sells the products other than the books.

In view of this point, as illustrated in FIG. 10, the importance corresponding information 5'$d$ in this example is information where plural instances of query importance X are made to correspond to the individual test queries depending on the different shopping sites possibly assumed as the application destination environments of the new algorithms.

Specifically, in the importance corresponding information 5'$d$ of this example, to the individual test queries, the plural instances of query importance X depending on a general product shopping site, a book shopping site, and a travel service shopping site are made to correspond.

The general product shopping site is a shopping site that mainly sells general products such as food products, beverages, daily goods, furniture, and electronic devices. The book shopping site is a shopping site that mainly sells package media or similar media that record contents, such as books as print media, electronic books, music, and videos. The travel service shopping site is a shopping site that mainly sells accommodation service products to enjoy accommodation service at a hotel, an inn, or a similar accommodation; transportation facilities ticket products to use various transportation facilities service such as trains, buses, and airplanes; package tour products that packages the accommodation service products and the transportation facilities ticket products; or a similar products.

Figure 11:
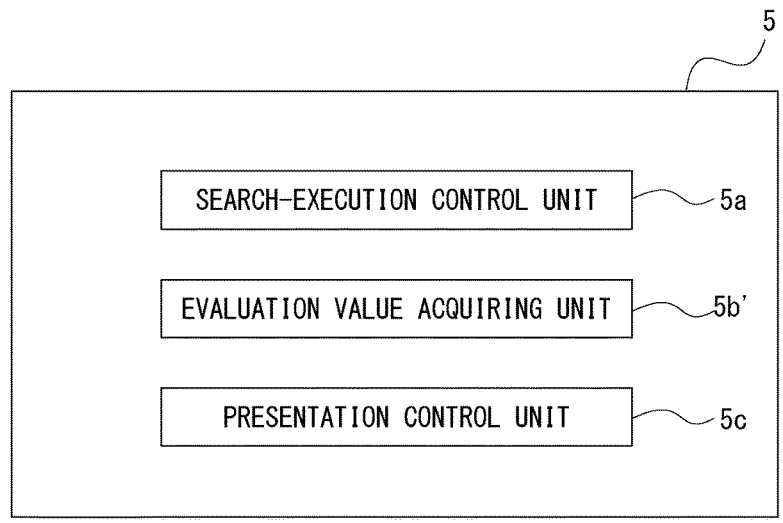
FIG. 11 is a block diagram illustrating functions that the information processing device of the second embodiment has as function blocks.

FIG. 11 is a block diagram illustrating functions that the controller 5' has as a function block.

As can be seen by comparison with FIG. 5, which is described above, the controller 5' differs from the controller 5 in that an evaluation value acquiring unit 5$b$' is disposed instead of the evaluation value acquiring unit 5$b$.

The evaluation value acquiring unit 5$b$' adjusts the ranking evaluation values Vr, which are calculated by the ranking evaluation value calculating devices 4 and 4, based on instructed application destination identification information and based on the query importance X, which is acquired from the importance corresponding information 5'$d$.

In this example, a person who conducts the test or a similar person performs the operation input on the controller 5' to instruct the application destination identification information together with an instruction of the start of the comparison test. The application destination identification information represents a difference in the application destination environment of the new algorithm. Based on the application destination identification information thus instructed, the evaluation value acquiring unit 5$b$' acquires the test queries used for the search by the first preliminary environment search device 3-1 and the second preliminary environment search device 3-2 and one instance of query importance X among the plural instances of query importance X made to correspond to the identical test queries from the importance corresponding information 5'$d$. The evaluation value acquiring unit 5$b$' adjusts the ranking evaluation values Vr calculated by the ranking evaluation value calculating devices 4 and 4 based on the acquired query importance X.

The evaluation value acquiring unit 5$b$' performs the acquisition of the query importance X from the importance corresponding information 5'$d$ and the adjustment of the ranking evaluation values Vr based on the acquired query importance X on the respective ranking evaluation values Vr for each test query sequentially received from the ranking evaluation value calculating devices 4 and 4.

The adjustment in this case is performed by multiplying the ranking evaluation values Vr by the query importance X.

The evaluation value acquiring unit 5$b$' in this case acquires the plurality of evaluation values through the adjustment with the above-described query importance X on the respective current algorithm side and new algorithm side. The evaluation value acquiring unit 5$b$' acquires the integrated evaluation value of the plurality of evaluation values after the adjustment thus acquired at the current algorithm side as the first evaluation value. The evaluation value acquiring unit 5$b$' acquires the integrated evaluation value of the plurality of evaluation values after the adjustment acquired at the new algorithm side as the second evaluation value.

In this case as well, as the integrated evaluation value, as the example shown in the first embodiment, the summed value, the average value, or a similar value is calculated.

The presentation control unit 5$c$ causes the display or a similar device to present the first evaluation value and the second evaluation value, which are acquired by the evaluation value acquiring unit 5$b$', as the relative evaluation information similar to the first embodiment.

The above-described controller 5' can evaluate the new algorithms using the different query importance X according to the difference in the application destination environment of the new algorithm.

The use of the query importance X according to the difference in the application destination environment of the new algorithm is not necessary. The importance corresponding information 5'$d$ can be information to which only the one instance of query importance X is made to correspond to each test query. In this case, it is not necessary for the evaluation value acquiring unit 5$b$' to selectively acquire the query importance X based on the application destination identification information. Among the instances of query importance X in the importance corresponding information 5'$d$, the evaluation value acquiring unit 5$b$' acquires the one instance of query importance X made to correspond to the test query identical to the test query used for the search. Based on the acquired query importance X, the evaluation value acquiring unit 5$b$' adjusts the ranking evaluation value Vr.

2-2. Processing Procedure

Figure 12:
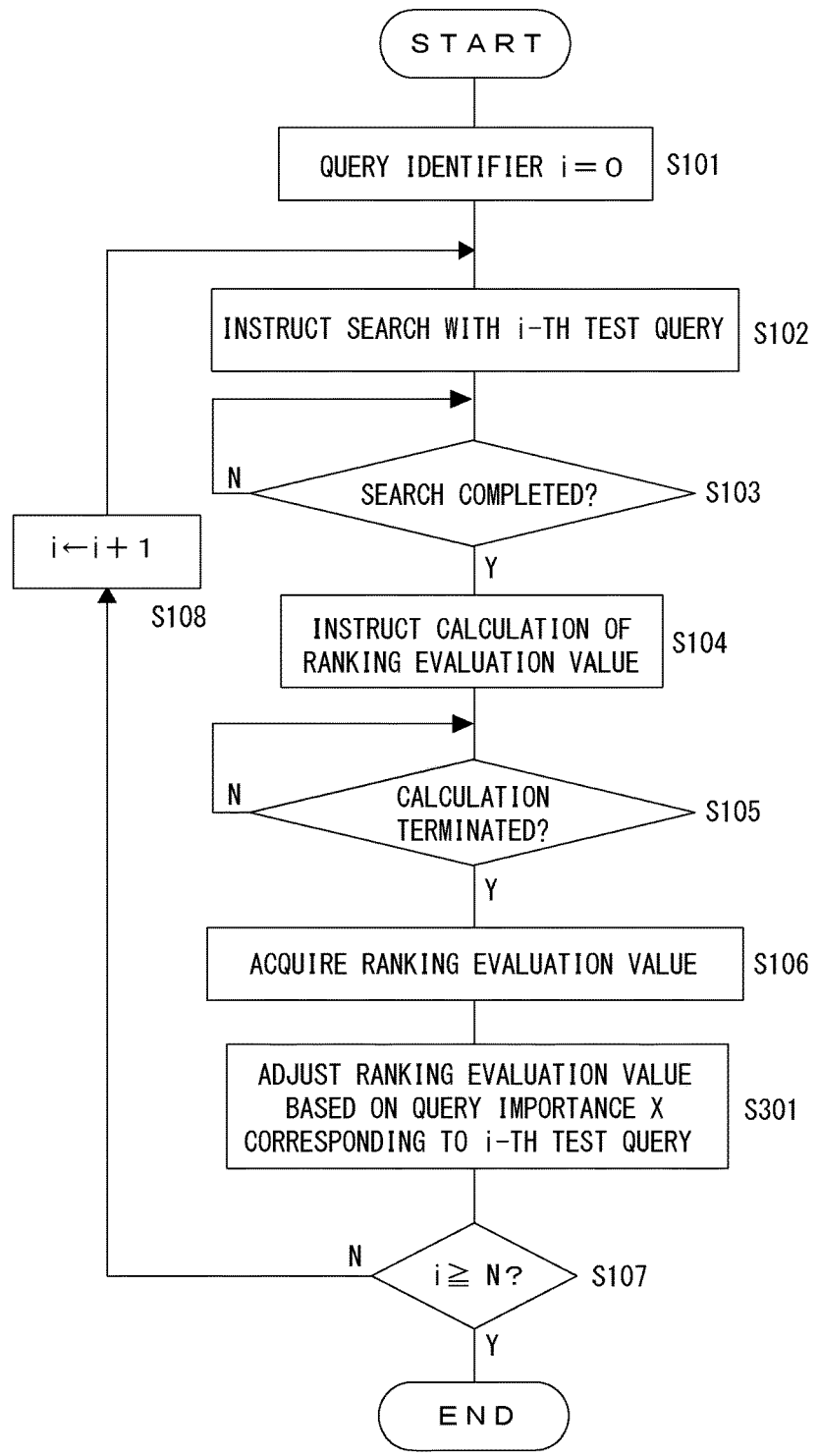
FIG. 12 is a flowchart showing processing to implement the functions of the information processing device of the second embodiment.

FIG. 12 is a flowchart showing a specific processing procedure to implement functions of the above-described controller 5'.

The processing shown in 12 also starts, for example, in response to the operation input instructing the start of the comparison test by a person who conducts the test or a similar person. As described above, a person who conducts the test or a similar person instructs the application destination identification information on the controller 5' of the second embodiment together with the instruction of the start of the comparison test.

The processing shown in FIG. 12 shows processing performed on one of the current algorithm side and the new algorithm side similar to FIG. 7, which is described above. The controller 5', for example, concurrently performs the processing shown in FIG. 12 on both the current algorithm side and the new algorithm side.

In FIG. 12, respective processing at Steps S101 to S106 and Steps S107 and S108 are similar to the processing described in FIG. 7; therefore, the overlapped explanation is avoided.

In response to the acquisition of the ranking evaluation value Vr at Step S106, the controller 5' adjusts the ranking evaluation value Vr based on the query importance X corresponding to the i-th test query at Step S301. That is, this example acquires the one query importance X based on the instructed application destination identification information among the plural instances of query importance X made to correspond to the i-th test query in the importance corresponding information 5'd. Based on the acquired query importance X, the controller 5' adjusts the ranking evaluation value Vr acquired at Step S106.

In response to the execution of the adjustment processing at Step S301, the controller 5' advances the processing to Step S107. This acquires the ranking evaluation values Vr for the n pieces of test queries adjusted with the query importance X.

Here, as understood from the above-described explanation, by the execution of the processing shown in FIG. 12 on the current algorithm side and the new algorithm side, the evaluation value acquiring unit 5b' of the controller 5' acquires the first evaluation value and the second evaluation value as the integrated evaluation values based on the plurality of evaluation values (the evaluation values after adjustment with the query importance X) acquired at the respective current algorithm side and new algorithm side. The presentation control unit 5c of the controller 5' performs a presentation control of the relative evaluation information based on the first evaluation value and the second evaluation value thus acquired.

The processing procedure to implement the functions of these evaluation value acquiring unit 5b' and presentation control unit 5c are similar to the processing procedure shown in FIG. 8, which is described above; therefore, the overlapped explanation is avoided.

2-3. Summary of Second Embodiment

As described above, in the information processing device (the controller 5') of the second embodiment, the evaluation value acquiring unit 5b' is configured to acquire query importance corresponding to the selection test queries based on the importance corresponding information 5'd. In the importance corresponding information 5'd, the query importance X is made to correspond to each of the test queries. The query importance X represents degree of importance of the individual test queries. The evaluation value acquiring unit 5b' is configured to adjust the respective evaluation values related to the rankings calculated on the first test search and the second test search based on the acquired query importance. The evaluation value acquiring unit 5b' is configured to acquire the first evaluation value and the second evaluation value based on the adjusted respective evaluation values.

Even if an evaluation value of a search result using a less important query is high, it cannot be said that the level of the search performance of the search algorithm is high. In view of this, according to the degree of importance of the query used for the test search, the first evaluation value and the second evaluation value are adjusted.

This boosts an evaluation value for a test search using an important query and lowers an evaluation value for the test search using an unimportant query. Thus, evaluation for a test search can be more appropriately conducted.

Consequently, this allows further properly conducting the acceptance-or-rejection judgment on the new algorithm considering the degree of importance of the query used for test search.

In the information processing device of the second embodiment, the importance corresponding information 5'd includes plural instances of the query importance X depending on different application destination environments for the second search algorithm. The plural instances of query importance X are made to correspond to the individual test queries. The evaluation value acquiring unit 5b' is configured to acquire the one instance of query importance X based on instructed application destination identification information among plural instances of the query importance X. The plural instances of query importance X are made to correspond to test queries identical to the selection test queries in the importance corresponding information 5'd. The evaluation value acquiring unit 5b' is configured to adjust the respective evaluation values related to the rankings calculated on the first test search and the second test search based on the acquired query importance X. The evaluation value acquiring unit 5b' is configured to acquire the first evaluation value and the second evaluation value based on the adjusted respective evaluation values.

When the application destination environments for the search algorithms differ, the degree of importance to the environments may differ even if the identical query is used. To handle such situation, an evaluation on the new algorithm using different query importance X depending on the difference in the application destination environment is available.

This allows further properly performing the evaluation on the new algorithm. This allows further properly conducting the acceptance-or-rejection judgment on the new algorithm considering the application destination environment of this new algorithm.

3. Program and Storage Medium

The controllers 5 and 5' as the embodiments of the information processing devices according to the present invention are described above. The program of the embodiments is a program that causes the information processing device (such as a CPU) to execute processing in the controllers 5 and 5'.

The program of the embodiment causes an information processing device to execute processing of search-execution control processing, evaluation value acquiring processing, and presentation control processing. The search-execution control processing is configured to perform respective searches with an identical selection test query as a first test search and a second test search. The identical selection test query is selected among a plurality of preliminary selected test queries. The first test search sets a plurality of test content data items including character information as a search target. The first test search is performed using the first search algorithm. The second test search sets the plurality of test content data items as a search target. The second test search is performed using the second search algorithm. The evaluation value acquiring processing is configured to acquire a first evaluation value for the first search algorithm and a second evaluation value for the second search algorithm based on evaluation values related to the rankings of the first test search and the second test search. The evaluation values are calculated based on ranking information of the test content data items hit by a search and relevance corresponding information acquired by the respective first test search and second test search. In the relevance corresponding information, a relevance score R is made to correspond to a test query of a test content data item for each set of the test query and the test content data item related to this test query. The presentation control processing is configured to perform a control to present relative evaluation information of the second search algorithm with respect to the first search algorithm based on the first evaluation value and the second evaluation value.

That is, this program corresponds to the program that causes the information processing devices (the controllers 5 and 5') to execute the processing described in FIG. 7 and FIG. 8.

This program allows implementing the information processing devices as the above-described controllers 5 and 5'.

Such program can be preliminarily stored in an HDD as a storage medium built into a device such as a computer device, a ROM in a microcomputer including a CPU, or a similar medium. Alternatively, a removable storage medium, such as a semiconductor memory, a memory card, an optical disk, a magneto-optical disk, or a magnetic disk, can store (memorize) the program temporarily or permanently. Such removable storage medium can be provided as so-called package software.

Such program can be installed from the removable storage medium to a personal computer or a similar device. Besides, the program can also be downloaded from a download site via a network such as a LAN and the Internet.

4. Modifications

The present invention is not limited to the above-described specific examples but various modifications are possible.

For example, a case where the present invention is applied to the system presuming the search on a product web page is described above. However, the present invention is preferably and widely applicable to a system that searches content data items including character information.

Regarding the query importance X according to the application destination environment for the new algorithm, a case is described above, where the importance corresponding information 5'*d* that stores instances of query importance X depending on the application destination environments is in use. However, as the importance corresponding information of the present invention, only one instance of query importance X as a reference for each test query may be made to correspond. Such query importance X may be adjusted with a coefficient according to the instructed application destination environment information. Then, the query importance X after adjustment may be used for adjustment of the ranking evaluation value Vr.

Only one common preliminary environment evaluation DB 2 can be provided to the first test search and the second test search.

Furthermore, one device can perform the first test search and the second test search by, for example, time division processing and parallel processing. Similarly, one device can calculate the ranking evaluation values Vr at the current algorithm side and the new algorithm side by, for example, the time division processing and the parallel processing.

REFERENCE SIGNS LIST

1, 1' preliminary environment evaluation system
2 preliminary environment evaluation DB
2*a* relevance corresponding information
3-1 first preliminary environment search device
3-2 second preliminary environment search device
4 ranking evaluation value calculating device
5, 5' controller
5*a* search-execution control unit
5*b*, 5*b*' evaluation value acquiring unit
5*c* presentation control unit
5'*d* importance corresponding information

What is claimed is:

1. A special purpose computer architecture for searching a content data item related to an input query among a plurality of content data items including character information, wherein a search algorithm for scoring and ranking the content data items hit by the search includes a first search algorithm and a second search algorithm, wherein the first search algorithm has been used in an actual environment of electronic commerce, wherein the second search algorithm is a version upgrade from the first search algorithm, and wherein the preliminary test is performed in a preliminary environment of electronic commerce, wherein the computer architecture is to be used for the comparison test between the first search algorithm and the second search algorithm, the comparison test being conducted based on an evaluation index different from the actual environment under a preliminary environment different from the actual environment, the computer architecture comprising:

at least one memory configured to store computer program code;

at least one microprocessor configured to access said memory and carry out instructions contained in said computer program code, said computer program code including:

search-execution control code configured to cause at least one of said at least one microprocessor to perform respective searches with an identical selection test query as a first test search and a second test search, the identical selection test query being selected among a plurality of preliminary selected test queries, wherein the plurality of preliminary selected test queries are stored in a preliminary environment evaluation database, the first test search setting a plurality of test content data items including character information as a search target, the first test search being performed using the first search algorithm, the second test search setting the plurality of test content data items as a search target, the second test search being performed using the second search algorithm;

evaluation value acquiring code configured to cause at least one of said at least one microprocessor to acquire a first evaluation value for the first search algorithm and a second evaluation value for the second search algorithm based on evaluation values related to the rankings of the first test search and the second test search, the evaluation values being calculated based on ranking information of the test content data items hit by a search and relevance corresponding information acquired by the respective first test search and second test search, in the relevance corresponding information, a relevance score being made to correspond to a test query of a test content data item for each set of the test query and the test content data item related to the test query; and presentation control code configured to cause at least one of said at least one microprocessor to perform a control to present relative evaluation information of the second search algorithm with respect to the first search algorithm based on the first evaluation value and the second evaluation value.

2. The special purpose computer architecture according to claim 1, wherein
the search-execution control code is configured to cause at least one of said at least one microprocessor to perform a control to perform the first test search and the second test search with each of a plurality of selection test queries, and
the evaluation value acquiring code is configured to cause at least one of said at least one microprocessor to acquire the first evaluation value and the second evaluation value based on the evaluation values related to the rankings of the first test search and the second test search, the evaluation values being calculated for each of the selection test queries in association with the control by the search-execution control code.

3. The special purpose computer architecture according to claim 2, wherein
the evaluation value acquiring code is configured to cause at least one of said at least one microprocessor to acquire a value found by integrating the evaluation values related to the ranking of the first test search calculated for each of the selection test queries into one as the first evaluation value, and
the evaluation value acquiring code is configured to cause at least one of said at least one microprocessor to acquire a value found by integrating the evaluation values related to the ranking of the second test search calculated for each of the selection test queries into one as the second evaluation value.

4. The special purpose computer architecture according to claim 1, wherein
the evaluation value acquiring code is configured to cause at least one of said at least one microprocessor to acquire query importance corresponding to the selection test queries based on importance corresponding information, in the importance corresponding information, the query importance being made to correspond to each of the test queries, the query importance representing degree of importance of the individual test queries,
the evaluation value acquiring code is configured to cause at least one of said at least one microprocessor to adjust the respective evaluation values related to the rankings calculated on the first test search and the second test search based on the acquired query importance, and
the evaluation value acquiring code is configured to cause at least one of said at least one microprocessor to acquire the first evaluation value and the second evaluation value based on the adjusted respective evaluation values.

5. The special purpose computer architecture according to claim 4, wherein
the importance corresponding information includes plural instances of the query importance depending on different application destination environments for the second search algorithm, the plural instances of query importance being made to correspond to the individual test queries,
the evaluation value acquiring code is configured to cause at least one of said at least one microprocessor to acquire one instance of the query importance based on instructed application destination identification information among the plural instances of the query importance, the plural instances of query importance being made to correspond to test queries identical to the selection test queries in the importance corresponding information,
the evaluation value acquiring code is configured to cause at least one of said at least one microprocessor to adjust the respective evaluation values related to the rankings calculated on the first test search and the second test search based on the acquired query importance, and
the evaluation value acquiring code is configured to cause at least one of said at least one microprocessor to acquire the first evaluation value and the second evaluation value based on the adjusted respective evaluation values.

6. The special purpose computer architecture of claim 1 wherein the plurality of test content data items comprise document data in text.

7. The special purpose computer architecture of claim 1, further comprising a preliminary environment evaluation database configured to store the plurality of test content data items as a search target of the second test search, wherein the plurality of test content data items comprise document data in text.

8. An information processing method performed by a computer system comprising at least one computer processor, the computer system searching a content data item related to an input query among a plurality of content data items including character information, wherein a search algorithm for scoring and ranking the content data items hit by the search includes a first search algorithm and a second search algorithm, wherein the first search algorithm has been used in an actual environment of electronic commerce, wherein the second search algorithm is a version upgrade from the first search algorithm, and wherein the preliminary test is performed in a preliminary environment of electronic commerce, wherein the computer system is to be used for the comparison test between the first search algorithm and the second search algorithm, the comparison test being conducted based on an evaluation index different from the actual environment under a preliminary environment different from the actual environment, the information processing method comprising:
a search-execution control procedure configured to perform respective searches with an identical selection test query as a first test search and a second test search, the identical selection test query being selected among a plurality of preliminary selected test queries, wherein the plurality of preliminary selected test queries are stored in a preliminary environment evaluation database, the first test search setting a plurality of test content data items including character information as a search target, the first test search being performed using the first search algorithm, the second test search setting the plurality of test content data items as a search target, the second test search being performed using the second search algorithm;
an evaluation value acquiring procedure configured to acquire a first evaluation value for the first search algorithm and a second evaluation value for the second search algorithm based on evaluation values related to the rankings of the first test search and the second test search, the evaluation values being calculated based on ranking information of the test content data items hit by a search and relevance corresponding information acquired by the respective first test search and second test search, in the relevance corresponding information, a relevance score being made to correspond to a test query of a test content data item for each set of the test query and the test content data item related to the test query; and a presentation control procedure configured to perform a control to present relative evaluation information of the second search algorithm with respect to the first search algorithm based on the first evaluation value and the second evaluation value.

9. The information processing method according to claim 8, wherein
a control to perform the first test search and the second test search with each of a plurality of selection test queries is performed in the search-execution control procedure, and
the first evaluation value and the second evaluation value is acquired based on the evaluation values related to the rankings of the first test search and the second test search, the evaluation values being calculated for each of the selection test queries in association with the control by the search-execution control procedure in the evaluation value acquiring procedure.

10. The information processing method according to claim 9, wherein in the evaluation value acquiring procedure:
a value found by integrating the evaluation values related to the ranking of the first test search calculated for each of the selection test queries into one is acquired as the first evaluation value, and a value found by integrating the evaluation values related to the ranking of the second test search calculated for each of the selection test queries into one is acquired as the second evaluation value.

11. The information processing method according to claim 8, wherein in the evaluation value acquiring procedure:
query importance corresponding to the selection test queries is acquired based on importance corresponding information, in the importance corresponding information, the query importance being made to correspond to each of the test queries, the query importance representing degree of importance of the individual test queries, the respective evaluation values related to the rankings calculated on the first test search and the second test search is adjusted based on the acquired query importance, and the first evaluation value and the second evaluation value is acquired based on the adjusted respective evaluation values.

12. The information processing method according to claim 11, wherein the importance corresponding information includes plural instances of the query importance depending on different application destination environments for the second search algorithm, the plural instances of query importance being made to correspond to the individual test queries, in the evaluation value acquiring procedure:
one instance of the query importance is acquired based on instructed application destination identification information among the plural instances of the query importance, the plural instances of query importance being made to correspond to test queries identical to the selection test queries in the importance corresponding information, the respective evaluation values related to the rankings calculated on the first test search and the second test search is adjusted based on the acquired query importance, and the first evaluation value and the second evaluation value is acquired based on the adjusted respective evaluation values.

13. A non-transitory storage medium that stores a computer program, the computer program causing an information processing device to execute processing, the information processing device searching a content data item related to an input query among a plurality of content data items including character information, wherein a search algorithm for scoring and ranking the content data items hit by the search includes a first search algorithm and a second search algorithm, wherein the first search algorithm has been used in an actual environment of electronic commerce, wherein the second search algorithm is a version upgrade from the first search algorithm, and wherein the preliminary test is performed in a preliminary environment of electronic commerce, wherein the information processing device is to be used for the comparison test between the first search algorithm and the second search algorithm, the comparison test being conducted based on an evaluation index different from the actual environment under a preliminary environment different from the actual environment, the storage medium storing the program causing the information processing device to execute:
a search-execution control processing configured to perform respective searches with an identical selection test query as a first test search and a second test search, the identical selection test query being selected among a plurality of preliminary selected test queries, wherein the plurality of preliminary selected test queries are stored in a preliminary environment evaluation database, the first test search setting a plurality of test content data items including character information as a search target, the first test search being performed using the first search algorithm, the second test search setting the plurality of test content data items as a search target, the second test search being performed using the second search algorithm;

an evaluation value acquiring processing configured to acquire a first evaluation value for the first search algorithm and a second evaluation value for the second search algorithm based on evaluation values related to the rankings of the first test search and the second test search, the evaluation values being calculated based on ranking information of the test content data items hit by a search and relevance corresponding information acquired by the respective first test search and second test search, in the relevance corresponding information, a relevance score being made to correspond to a test query of a test content data item for each set of the test query and the test content data item related to the test query; and a presentation control processing configured to perform a control to present relative evaluation information of the second search algorithm with respect to the first search algorithm based on the first evaluation value and the second evaluation value.

14. The non-transitory storage medium according to claim 13, wherein
a control to perform the first test search and the second test search with each of a plurality of selection test queries is performed in the search-execution control processing, and
the first evaluation value and the second evaluation value is acquired based on the evaluation values related to the rankings of the first test search and the second test search, the evaluation values being calculated for each of the selection test queries in association with the control by the search-execution control processing in the evaluation value acquiring processing.

15. The non-transitory storage medium according to claim 14, wherein in the evaluation value acquiring processing:
a value found by integrating the evaluation values related to the ranking of the first test search calculated for each of the selection test queries into one is acquired as the first evaluation value, and a value found by integrating the evaluation values related to the ranking of the second test search calculated for each of the selection test queries into one is acquired as the second evaluation value.

16. The non-transitory storage medium according to claim 13, wherein in the evaluation value acquiring processing:
query importance corresponding to the selection test queries is acquired based on importance corresponding information, in the importance corresponding information, the query importance being made to correspond to each of the test queries, the query importance representing degree of importance of the individual test queries, the respective evaluation values related to the rankings calculated on the first test search and the second test search is adjusted based on the acquired query importance, and the first evaluation value and the second evaluation value is acquired based on the adjusted respective evaluation values.

17. The non-transitory storage medium according to claim 16, wherein the importance corresponding information includes plural instances of the query importance depending on different application destination environments for the second search algorithm, the plural instances of query importance being made to correspond to the individual test queries, in the evaluation value acquiring processing:
one instance of the query importance is acquired based on instructed application destination identification information among the plural instances of the query importance, the plural instances of query importance being made to correspond to test queries identical to the selection test queries in the importance corresponding information, the respective evaluation values related to the rankings calculated on the first test search and the second test search is adjusted based on the acquired query importance, and the first evaluation value and the second evaluation value is acquired based on the adjusted respective evaluation values.

18. A non-transitory computer readable medium configured to store program code for execution by at least one microprocessor to determine if a version upgrade from a current search engine to a second search engine passes a preliminary test based on a plurality of test content data items comprising a first test content data item and a second test content data item, wherein the current search engine has been used in an actual environment of electronic commerce, and wherein the preliminary test is performed in a preliminary environment of electronic commerce, the program code comprising:

first search-execution control code configured to cause at least one of said at least one microprocessor to perform a first search using the current search engine with a first query over the plurality of test content data items, wherein a plurality of test queries includes the first query, and wherein the plurality of test queries are stored in a preliminary environment evaluation database;

second search-execution control code configured to cause the at least one of said at least one microprocessor to perform a second search using the second search engine with the first query over the plurality of test content data items;

evaluation code configured to cause the at least one of said at least one microprocessor to:
determine a first evaluation value for the current search algorithm based on: i) the first query, ii) a first search hit returned by the current search algorithm in response to the test query, and iii) a first relevance score indicative of a first relevance of the first search hit to the first query, wherein the first search hit corresponds to the first test content data item and wherein the first search hit and first query are associated with the first relevance score in relevance corresponding information;
determine a second evaluation value for the second search algorithm based on: i) the first query, ii) a second search hit returned by the second search algorithm in response to the test query, and iii) a second relevance score indicative of a second relevance of the second search hit to the first query, wherein the second search hit corresponds to the second test content data item and wherein the second search hit and first query are associated with the second relevance score in the relevance corresponding information;

comparison test code configured to cause the at least one of said at least one microprocessor to determine, using a ranking calculated based on relevance information, whether the second search engine passes the preliminary test based on the first evaluation value and the second evaluation value; and presentation control code configured to cause the at least one of said at least one microprocessor to perform a control to present relative evaluation information of the second search algorithm with respect to the current search algorithm based on the first evaluation value and the second evaluation value.

19. The non-transitory computer readable medium of claim 18, wherein the second search engine passes the preliminary test when the second evaluation value is better than the first evaluation value.

20. The non-transitory computer readable medium of claim 18, wherein the second search engine passes the preliminary test when the second evaluation value indicates the second search algorithm is capable of minimum search performance in an actual environment.

* * * * *